(12) United States Patent
Morikiyo et al.

(10) Patent No.: US 6,324,992 B1
(45) Date of Patent: Dec. 4, 2001

(54) HYBRID CARRYING TRUCK (75) Inventors: Akira Morikiyo; Susumu Kawano; Ichiro Ueno, all of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/541,111

(22) Filed: Mar. 31, 2000

(30) Foreign Application Priority Data

May 14, 1999 (JP) .................................................. 11-133925

(51) Int. Cl.$^7$ ...................................................... B61B 10/00
(52) U.S. Cl. .................. 104/172.3; 104/165; 104/172.1; 104/172.5; 198/465.1; 198/465.3
(58) Field of Search ................................ 104/165, 172.1, 104/172.3, 172.5; 198/867.14, 465.1, 465.3, 341

(56) References Cited

U.S. PATENT DOCUMENTS

| | | | |
|---|---|---|---|
| 4,438,701 | * | 3/1984 | Murai et al. ....................... 104/172.3 |
| 4,548,135 | * | 10/1985 | Kupczyk ............................. 104/172.3 |
| 4,564,100 | * | 1/1986 | Moon .................................. 104/172.3 |
| 4,811,685 | * | 3/1989 | Murai ................................. 104/172.3 |
| 5,014,625 | * | 5/1991 | Murai et al. ....................... 104/172.3 |
| 5,195,630 | * | 3/1993 | Donovan et al. ................. 198/465.3 |
| 5,577,593 | * | 11/1996 | Hooper ................................. 104/165 |
| 5,603,769 | * | 2/1997 | Okubo et al. ..................... 198/465.3 |

* cited by examiner

Primary Examiner—S. Joseph Morano
Assistant Examiner—Lars A. Olson
(74) Attorney, Agent, or Firm—Howson & Howson

(57) ABSTRACT

A hybrid carrying truck is disclosed which has merits of both of a skid carrier and a carrying truck such that it can successively and smoothly transfer between different carrying lines to carry a work whatever the carrying lines are and can secure a removing position from the carrying line to a refuge area freely and with safety. The hybrid carrying truck includes traveling wheels mounted at front and back positions on the left and right sides of a truck body for being rolled on a pair of rails to allow the truck body to travel along a carrying line, a pair of left and right skid members mounted on a bottom face of the truck body and elongated in a carrying direction of the hybrid carrying truck, and a truck hauling engaging member mounted at a central position of the bottom face of the truck body in a widthwise direction of the truck body.

6 Claims, 9 Drawing Sheets

HYBRID CARRYING TRUCK

BACKGROUND OF THE INVENTION

1. Field of the Invention

This invention relates to a carrying truck for carrying a work such as a body of an automobile in a factory.

2. Description of the Related Art

Conventionally, various carriers for carrying a work between various working steps such as a carrying truck and a skid carrier are used in a factory.

Figure 8:
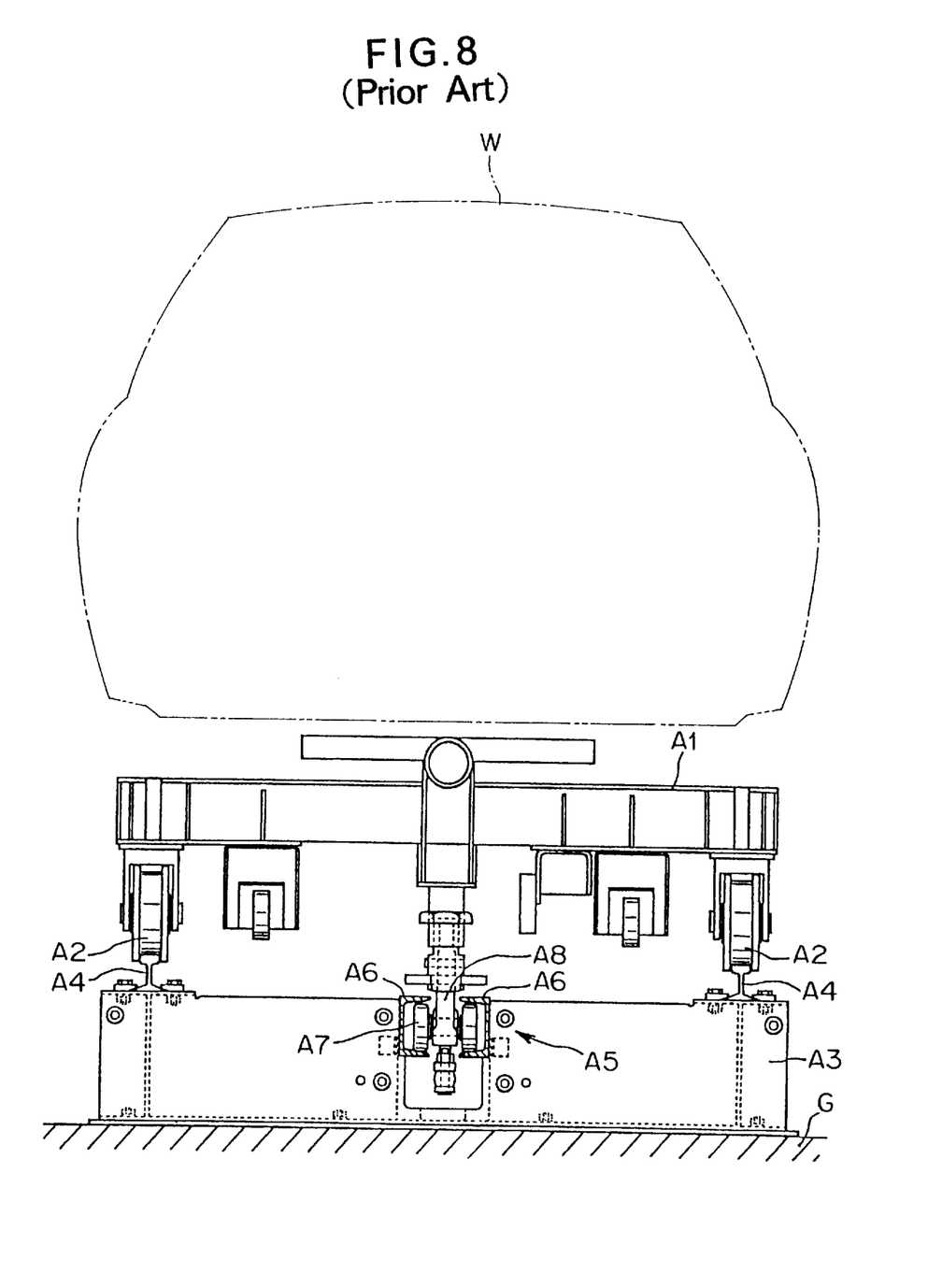
FIG. 8 is a vertical sectional view showing a conventional carrying truck and a truck carrying conveyor in a carrying condition.

FIG. 8 shows an example of a carrying truck for receiving a work W such as a body of an automobile and carrying the work in an oven in order to dry the work W after the work W is painted in a painting step. Referring to FIG. 8, a carrying truck A1 has four flanged traveling wheels A2 on a lower face of a body thereof. The traveling wheels A2 are supported on a pair of rails A4 secured to a support frame A3 on a floor face G in the oven and hauled by a truck carrying conveyor A5 provided between the rails A4 to carry the work W.

The truck carrying conveyor A5 has a trolley A8 guided and supported for traveling movement by and on guide rollers A7 which are rolled on a pair of guide rails A6 having a channel-shaped cross section and disposed in an opposing relationship to each other on the opposite left and right sides of the trolley A8. The trolley A8 of the truck carrying conveyor A5 is connected to a conveyor chain not shown such that, when the conveyor chain is driven, the carrying truck A1 travels.

Figure 9:
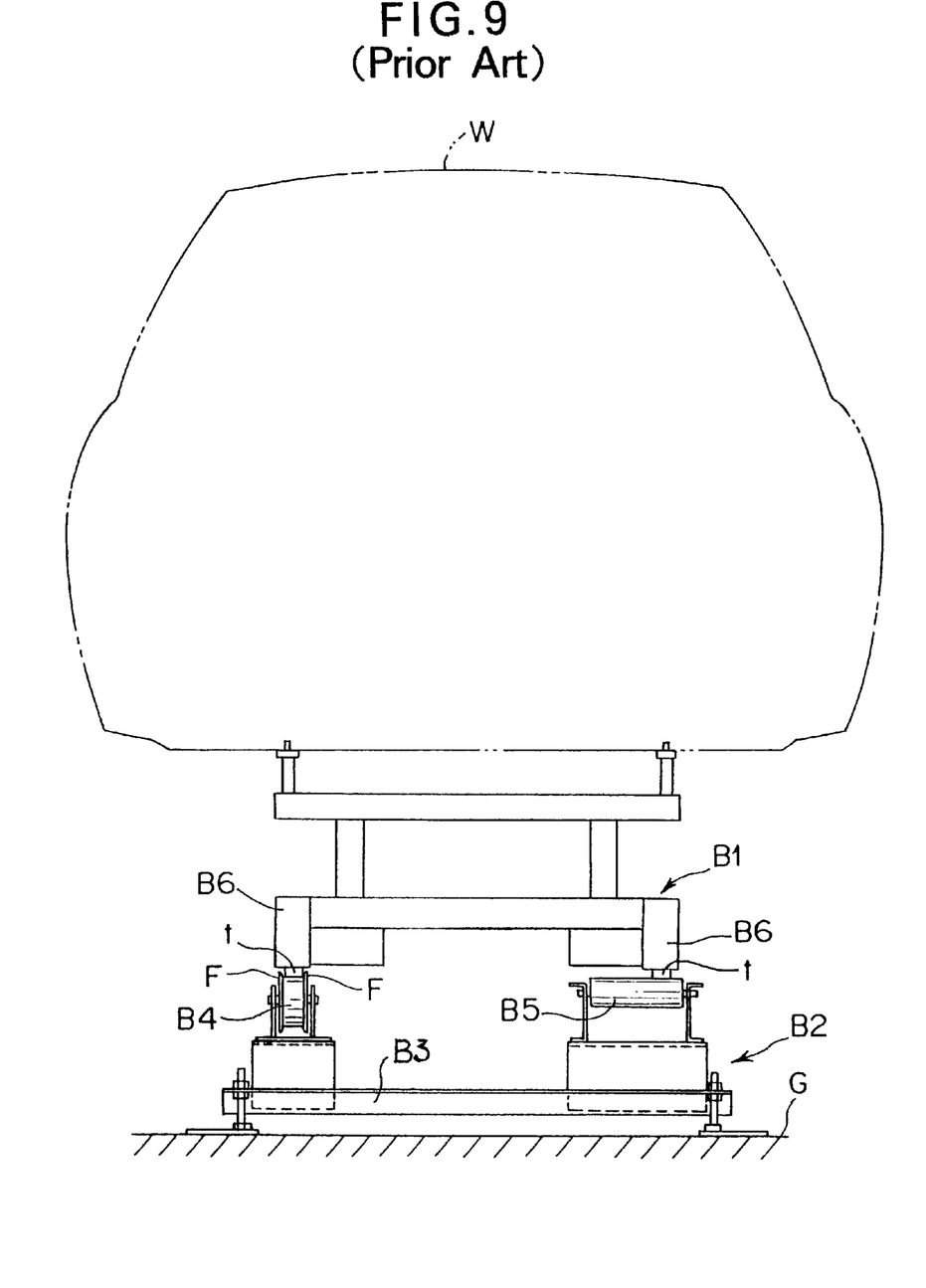
FIG. 9 is a similar view but showing a conventional skid carrier and a skid carrying roller conveyor in a carrying condition.

Meanwhile, FIG. 9 shows an example of a skid carrier for receiving a work W and carrying it in an oven. Referring to FIG. 9, the skid carrier is generally denoted at B1. A skid carrying roller conveyor B2 includes a support frame B3 located on a floor face, and a large number of flanged free rollers B4 arranged along a carrying direction at one of the opposite ends of the support frame B3 in a widthwise direction. A large number of drive rollers B5 are disposed at the other end portion of the support frame B3 in the widthwise direction in an opposing relationship to each of the flanged free rollers B4.

Each of the flanged free rollers B4 is mounted for free rotation around a horizontal axis and has a pair of flanges F formed on the opposite sides of an outer periphery thereof. Each of the flanged free rollers B4 thus guides, with the flanges F thereof, the opposite side faces of a roller contacting portion t provided at a bottom portion of one of a pair of skid legs B6 of the skid carrier B1, on which a work W is received, and receives, at the outer periphery thereof, the lower face of the roller contacting portion t.

Each of the drive rollers B5 receives, at an outer periphery thereof, the lower face of the roller contacting portion t of the other skid leg B6 of the skid carrier B1 so that the skid carrier B1 is carried by rotation of the drive roller B5.

In the conventional carrying truck A1 described above with reference to FIG. 8, since the traveling wheels A2 at the lower portions of the body are rolled on the rails A4 to cause the carrying truck A1 to travel, where the carrying truck A1 changes a truck carrying conveyor from a current step to a next step, where the carrying truck A1 transfers between a truck carrying conveyor and a traverser for carrying to an orthogonal carrying line or where the carrying truck A1 transfers between a truck carrying conveyor and a lifter, the allowable track connection distance or the allowable track offset distance between the rails A4 provided on the truck carrying conveyor, traverser, lifter and so forth are approximately 10 mm in the maximum particularly where such a work W as a body of an automobile is carried. If this allowable distance is exceeded, then smooth transfer becomes difficult, and high transferring power is required and accidental dislocation of the traveling wheels from the rails may possibly occur. Therefore, a carrying line must be designed taking prevention of such accidental dislocation as described above sufficiently into consideration.

Accordingly, where a carrying line for such a conventional carrying truck A1 as described above is laid, there is a problem that a heavy construction burden and a high cost are imposed in order to secure an appropriate allowable track connection distance and an appropriate allowable offset distance of the rails A4 which is heavy, thick, long and large.

Further, the conventional carrying truck A1 described above cannot be applied to a carrying line which includes such a skid carrying roller conveyor B2 as a roller conveyor or a friction roller conveyor because it does not have a lower body frame elongated in a carrying direction as is intended so as to engage with and be carried by the skid carrying roller conveyor B2 such as a roller conveyor or a friction conveyor. Therefore, there is a difficult problem that, in order to perform working operation for a work W, which has been carried by the carrying truck A1, on a carrying line which includes such a skid carrying roller conveyor B2 as described above, the work W must be transferred from the carrying truck A1 to the skid carrier B1.

Meanwhile, in the conventional skid carrier B1 described above with reference to FIG. 9, since it does not include wheels for traveling and the overall weight of the skid carrier B1 on which the work W is loaded is received by the large number of flanged free rollers B4 disposed on the skid carrying roller conveyor B2 side, a sufficient strength which eliminates distortion or deflection of the skid carrier B1 in its longitudinal direction must be assured. Consequently, the conventional skid carrier B1 has a problem in designing that the weight of the skid carrier B1 cannot be reduced readily.

Further, since the skid carrier B1 described above does not include such traveling wheels A2 as described above, even if a traverser is used, the skid carrier B1 cannot be removed from an ordinary carrying line to an arbitrary refuge area, different from the conventional carrying truck A1 which includes the traveling wheels A2, but the position for removal is limited only to a specific refuge area in which a large number of free rollers are provided on the floor. Therefore, the skid carrier B1 cannot take refuge to an arbitrary position. Where a large number of free rollers are provided specifically on the floor over a wide refuge area, this increases the cost for the equipment significantly and besides gives rise to restrictions to safety in working such as the necessity to draw a worker's attention so that the worker may not inadvertently step on the free rollers. Accordingly, there is a problem in working schedule control that it cannot be anticipated to maintain a predetermined production processing efficiency when a countermeasure against a trouble on the carrying line is taken.

Further, when it is tried to transfer such a skid carrier B1 as described above to a turntable or the like to change the carrying direction, the turntable is required to have an outer diameter sufficient to support the entire skid legs B6 which extend in the carrying direction, that is, an outer diameter corresponding to the overall length of the skid legs B6, and consequently, there are much restrictions to layout designing of the carrying line.

SUMMARY OF THE INVENTION

It is an object of the present invention to provide a hybrid carrying truck which has merits of both of a skid carrier and a carrying truck such that it can successively and smoothly transfer between different carrying lines to carry a work whatever the carrying lines are and can secure a removing position from the carrying line to a refuge area freely and with safety.

In order to attain the object described above, according to the present invention, there is provided a hybrid carrying truck, comprising a truck body, two pairs of traveling wheels mounted at front and back positions on the left and right sides of the truck body for being rolled on a pair of rails of a first type of carrying line to allow the truck body to travel along the first type of carrying line, a pair of left and right skid members mounted on a bottom face of the truck body and elongated in a carrying direction of the hybrid carrying truck for engaging with a pair of rows of rollers of a second type of carrying line to allow the truck body to travel along the second type of carrying line, and a truck hauling engaging member mounted at a central position of the bottom face of the truck body in a widthwise direction of the truck body for engaging with a truck hauling pusher dog disposed on the center line of the first or second type of carrying line or a third type of carrying line to allow the truck body to be hauled by the truck hauling pusher dog to travel along the carrying line.

The truck hauling engaging member may be an engaging toe pin provided on the bottom face of the truck body and projecting toward a floor of the carrying line.

Preferably, the skid members have an overall length in the carrying direction of the hybrid carrying truck greater than an overall length of a work to be carried by the hybrid carrying truck. With the present construction, where the hybrid carrying truck is applied to a storage conveyor apparatus, works to be carried by the hybrid carrying truck are prevented from contacting with each other, and consequently, reliable storage can be achieved.

Preferably, the traveling wheels are flanged wheels. Although the traveling wheels provided on the hybrid carrying truck may be any of flanged wheels and no-flanged wheels, where flanged wheels are used, prevention of meandering of the hybrid carrying truck and stable carrying can be achieved.

Preferably, the skid members form part of the truck body, and the traveling wheels are supported for rotation around respective horizontal axes on respective axles secured to the skid members. Due to the construction, the height of the hybrid carrying truck can be reduced and the center of gravity can be positioned low, and besides, simplification and reduction in weight of the truck body can be achieved.

In this instance, the axles may be mounted on inner side faces or outer side faces of the skid members in a widthwise direction of the truck body. Where the axles are mounted on the inner side faces of the skid members, the traveling wheels do not project outwardly from the skid members and safe working spaces can be assured at the opposite side portions below the truck body. Besides, sticking of paint to the traveling wheels in a painting step can be prevented, and consequently, a trouble in traveling which may be caused by such sticking of paint can be prevented. On the other hand, where the axles are mounted on the outer side faces of the skid members, a wide working space for the bottom portion of the truck body can be assured toward a central portion of the truck in the widthwise direction. Consequently, the operability in various works for the bottom portion of the truck body can be augmented significantly.

The hybrid carrying truck according to the present invention exhibits such various forms of use suitable for different carrying driving forms of the carrying line as described below to receive and carry a work.

1) In a carrying line which includes a skid carrying roller conveyor wherein a large number of flanged free rollers which rotate around respective horizontal axes are disposed on one side of the carrying path along a carrying direction and a drive roller which rotates around a horizontal axis is disposed on the other side of the carrying path in an opposing relationship to each of the flanged free rollers, the hybrid carrying truck is guided for traveling by the flanged free rollers with which one of the pair of skid members provided on the bottom face of the truck body engages without causing the traveling wheels at the front and rear positions on the left and right sides to function while the hybrid carrying truck is friction driven by the drive rollers with which the other skid member engages. Consequently, the hybrid carrying truck performs skid traveling.

It is to be noted that, in a simplified form of the carrying line wherein only a large number of flanged free rollers which rotate around respective horizontal axes are disposed on the opposite sides of the carrying path along a carrying direction, the pair of skid members are guided for traveling by the flanged free rollers by manual operation to cause the hybrid carrying truck to perform skid traveling.

2) In another carrying line which includes a pair of rails laid along a carrying direction and a truck hauling conveyor having a row of truck hauling pusher dogs at a central position in a widthwise direction of the track, the traveling wheels at the front and rear positions on the left and right provided on the bottom face of the truck body are guided to move along the rails without causing the pair of left and right skid members to function while the hybrid carrying truck is hauled by the truck hauling conveyor which includes the truck hauling pusher dogs with which the truck hauling engaging members engage. Consequently, the hybrid carrying truck performs wheel traveling.

It is to be noted that, in a simplified form of the carrying line wherein only a pair of rails are laid along a carrying direction, the traveling wheels at the front and rear positions on the left and right are guided to move along the rails by manual operation to cause the hybrid carrying truck to perform wheel traveling.

3) In a further carrying line which includes a truck hauling conveyor which in turn includes a large number of flanged free rollers disposed for rotation around their respective horizontal axes on the opposite sides of the carrying path along the carrying direction and a large number of truck hauling pusher dogs located in a row at central positions between the rows of the flanged free rollers, the hybrid carrying truck is guided for traveling movement by the flanged free rollers with which the pair of skid members provided on the bottom face of the truck body engage without causing the traveling wheels at the front and rear positions on the left and right to function and is hauled by the truck hauling conveyor having the truck hauling pusher dogs with which the truck hauling engaging members engage. Consequently, the hybrid carrying truck effects skid traveling.

4) In a still further carrying line which includes a skid carrying roller conveyor which in turn includes a pair of rails along a carrying direction and a large number of drive rollers disposed for rotation around respective horizontal axes along the carrying direction at positions on the inner side of the rails, the hybrid carrying truck is guided for traveling by the pair of rails while the traveling wheels at the front and rear positions on the left and right provided on the bottom face of the truck body support the overall weight of the truck body, and the hybrid carrying truck is friction driven by the drive rollers with which at least one of the pair of skid members provided on the bottom face of the truck body engages. Consequently, the hybrid carrying truck travels in a condition wherein the force for supporting the weight of the truck and the truck propelling force are individually allotted functionally.

5) In a yet further carrying line of a curved configuration which includes only a truck hauling conveyor having a large number of truck hauling pusher dogs without provision of a pair of rails extending along a carrying direction or a roller conveyor for skid carrying, the hybrid carrying truck is hauled only by the truck hauling conveyor having the truck hauling pusher dogs with which only the truck hauling engaging members provided on the bottom face of the truck body engage without causing the traveling wheels at the front and rear positions on the left and right and the pair of left and right skid members to function, and the overall weight of the truck body is supported by the truck hauling engaging members. Consequently, the hybrid carrying truck is hauled to travel only through the engagement with and the support by the truck hauling conveyor.

6) In transfer between carrying lines having different carrying driving forms such as between a carrying conveyor wherein the traveling wheels at the front and rear positions on the left and right do not function such as the carrying conveyor described in 1) or 3) above and another carrying conveyor wherein the pair of left and right skid members do not function such as the carrying conveyor described in 2) above, either while the traveling wheels at the front and rear positions on the left and right are guided for traveling along one of the carrying lines to support the truck body, the leading ends of the pair of left and right skid members are guided to the other carrying line having a different carrying path form and then the overall weight of the truck body is successively moved to transfer the hybrid carrying truck, or while the pair of left and right skid members are guided for traveling along both of the carrying lines having different carrying driving forms and the overall weight of the truck body is supported by both of the carrying lines, the traveling wheels at the front and rear positions on the left and right are guided to one of the carrying lines which is to subsequently receive the hybrid carrying truck and the overall weight of the truck body is gradually moved to transfer the hybrid carrying truck.

With the hybrid carrying truck according to the present invention, even if the carrying driving form of a carrying line is specified for a specific working process, the carrying functions of wheel carrying, skid carrying and hauling carrying can be selectively used in accordance with the specified carrying line. Consequently, an existing carrying line equipment can be used almost as it is.

Particularly where the hybrid carrying truck is used in carrying lines of different carrying driving forms, transfer between the carrying lines can be performed readily in carrying traveling of the hybrid carrying truck. Consequently, not only the degree of freedom in layout designing of a carrying line can be augmented, but also the carrying truck can be used commonly between the different carrying lines. Further, such a cumbersome operation of transferring a work carried on a carrying truck to another carrying truck for each working step as with a conventional carrying truck can be eliminated.

Further, with the hybrid carrying truck, since it includes the pair of left and right skid members for a roller conveyor mounted on the bottom face of the truck body which travels on the rails with the traveling wheels mounted at the front and back positions on the left and right sides of the truck body, where the carrying truck transfers between truck carrying conveyors along which the traveling wheels are rolled for traveling of the carrying truck, where the carrying truck transfers between a truck carrying conveyor and a traverser for carrying to an orthogonal carrying line or where the carrying truck transfers between a truck carrying conveyor and a lifter, while such a construction accuracy is required with a conventional carrying truck that the allowable track connection distance or the allowable track offset distance between them must be suppressed to approximately 10 mm in the maximum particularly where such a work as a body of an automobile is carried, smooth and reliable transfer can be achieved even if the construction accuracy is moderated significantly to approximately one third the overall length of the truck body (for example, where the overall length of the truck body is 4,000 mm, to approximately 1,300 mm). Consequently, the burden in and the cost required for the construction can be reduced significantly.

When the hybrid carrying truck travels along a carrying line which includes a skid carrying roller conveyor which in turn includes a pair of rails along a carrying direction and a large number of drive rollers disposed for rotation around respective horizontal axes along the carrying direction at positions on the inner side of the rails, the truck body on which a work is received travels on the rails with the traveling wheels at the front and rear positions on the left and right sides thereof and the overall weight of the truck body on which the work is received is not substantially loaded on the skid members for a roller conveyor. Consequently, the consumed power by the drive rollers which contact with the skid members for a roller conveyor can be reduced and a maximum propelling load efficiency can be exhibited with a low propelling force.

Further, when it is tried to remove the hybrid carrying truck into a refuge area from a carrying line which includes a skid carrying roller conveyor wherein a large number of flanged free rollers which rotate around respective horizontal axes are disposed on one side of the carrying path along a carrying direction and a drive roller which rotates around a horizontal axis is disposed on the other side of the carrying path in an opposing relationship to each of the flanged free rollers or another carrying line which includes a truck hauling conveyor which in turn includes a large number of flanged free rollers disposed for rotation around their respective horizontal axes on the opposite sides of the carrying path along the carrying direction and a large number of truck hauling pusher dogs located in a row at central positions between the rows of the flanged free rollers, since the hybrid carrying track itself can travel with the traveling wheels mounted at the front and back positions on the left and right sides of the truck body, it can be removed freely into an arbitrary refuge area in the proximity of the carrying line without being subject to restrictions to the position for removal as with a conventional skid carrier. Further, since there is no necessity for disposition of a large number of free rollers in the refuge area into which the hybrid carrying truck is to be removed, such an equipment cost as is required by a conventional carrying line can be reduced, and besides, the environment around the feet of a working person in the refuge area is simplified and the safety of the working person can be secured.

Where the hybrid carrying truck is transferred to a turntable or the like to change its carrying direction, the turntable need not have an outer diameter which corresponds to the overall length of the skid legs as in the case of a conventional skid carrier, but is required to have only an outer diameter corresponding to the distance between the front and rear traveling wheels. Therefore, miniaturization of the turntable can be achieved and the useless turning area can be reduced as far as possible to raise the degree of freedom in design layout of a carrying direction changing area.

As described above, the hybrid carrying truck has merits of both of a skid carrier and a carrying truck, and it can successively and smoothly transfer between different carrying lines to carry a work whatever the carrying lines are and can secure a removing position from the carrying line to a refuge area freely and with safety. Consequently, quality control in the carrying process can be achieved readily and with certainty.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENT

Figure 1:
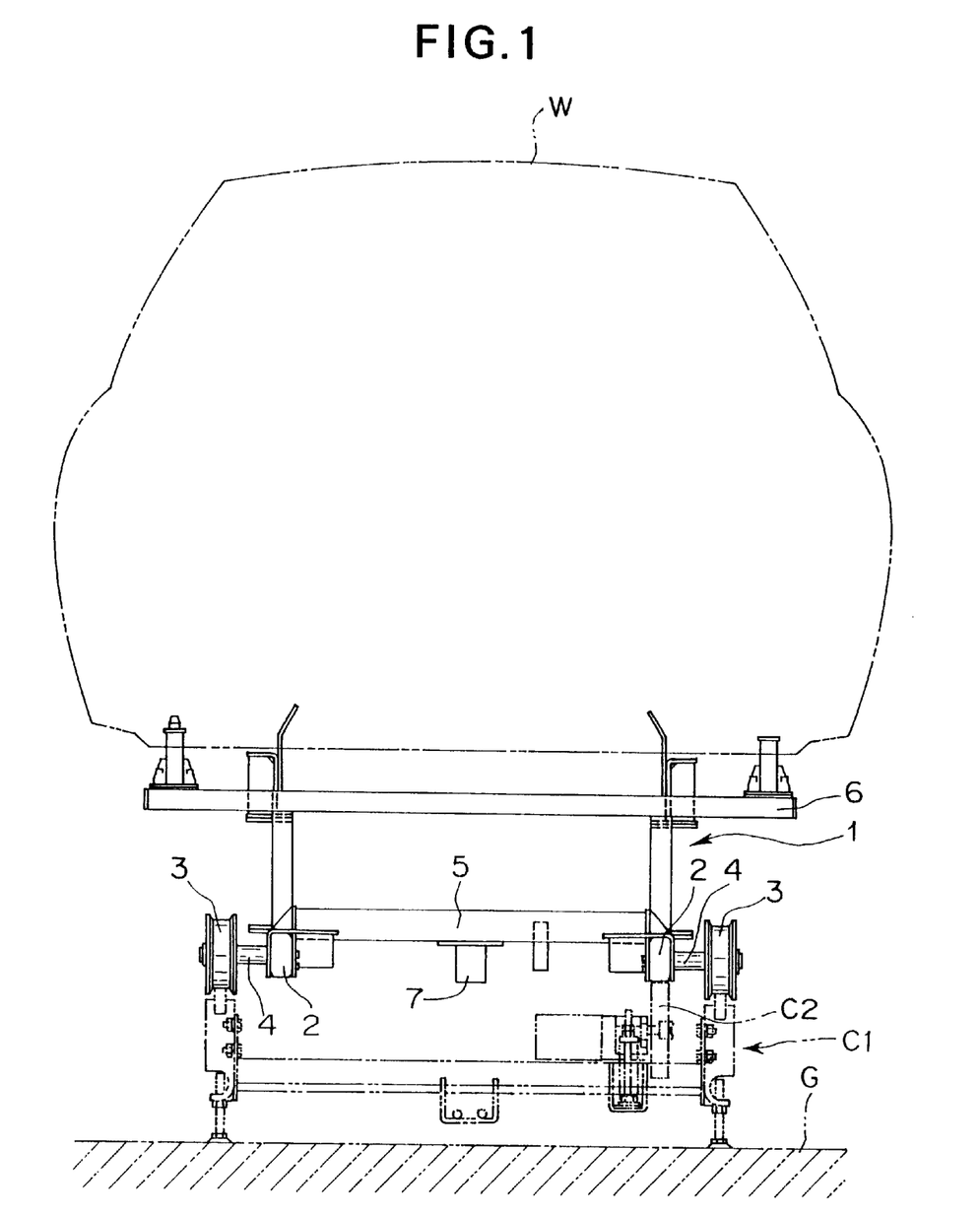
FIG. 1 is a vertical sectional view of a hybrid carrying truck to which the present invention is applied.
Figure 2:
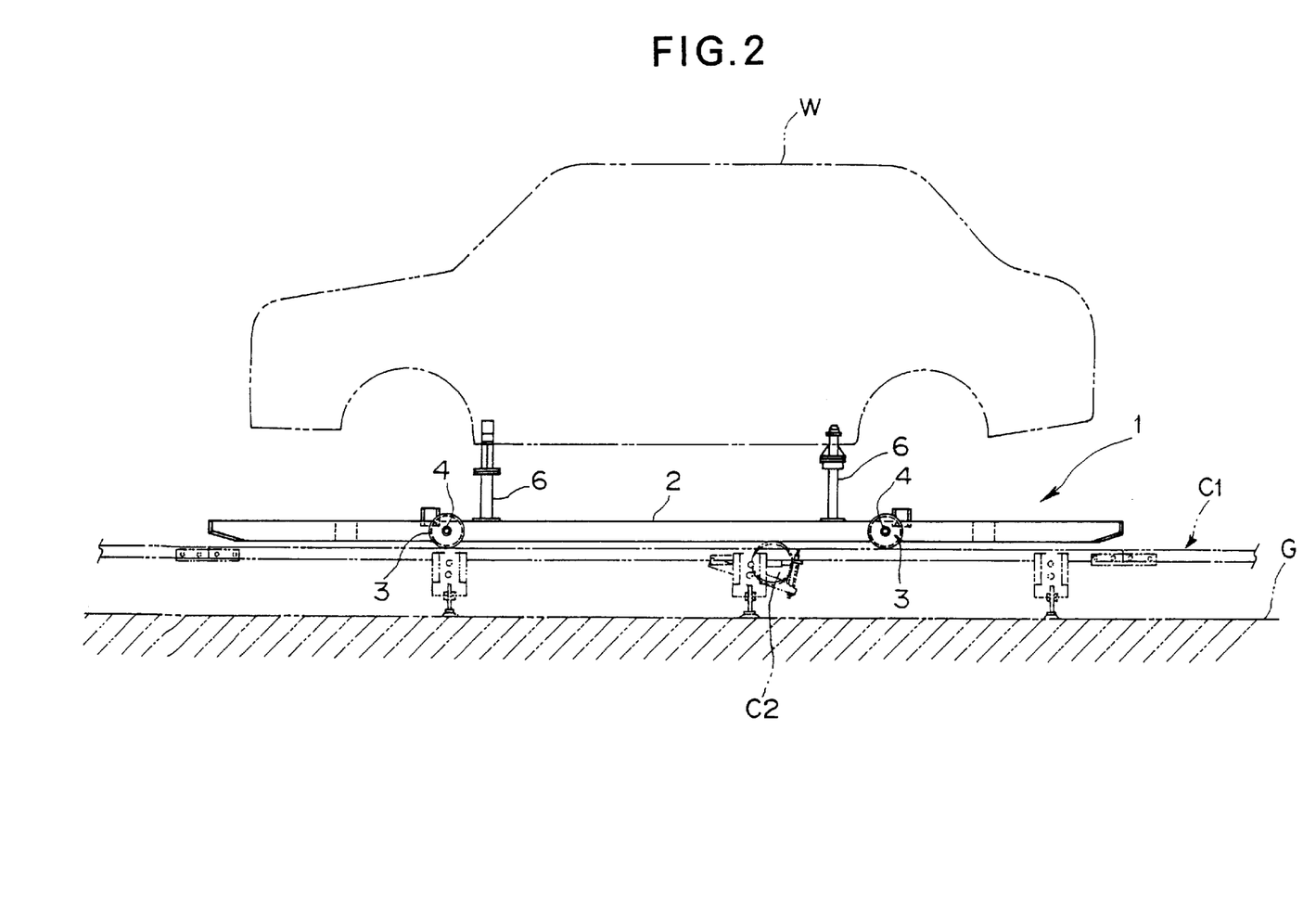
FIG. 2 is a side elevational view of the hybrid carrying truck.

Referring first to FIGS. 1 and 2, there is shown a hybrid carrying truck to which the present invention is applied. The hybrid carrying truck shown is used to carry an automobile body as a work W and is employed in an automobile painting step and so forth.

The hybrid carrying truck is generally denoted at 1 and includes a pair of left and right skid members 2 each formed from a hollow steel member and extending long in a carrying direction on the bottom face of a body of the truck. Where such a carrying conveyor C1 as indicated by imaginary lines in FIGS. 1 and 2 is used to carry the hybrid carrying truck 1, each of the skid members 2 is engaged with a large number of friction rollers C2 disposed along the carrying line to carry the truck body.

It is to be noted that, where a roller engaging member (not shown) which is superior in sliding movement characteristic is applied to a face of each of the skid members 2 which engages with and slidably moves on the friction rollers C2, the driving force consumed for carrying can be reduced and smooth carrying can be achieved advantageously.

Preferably, the overall length of the skid members 2 is set a little longer than the overall length of the work W to be carried because, when it is taken into consideration to store the hybrid carrying truck 1 on the carrying conveyor C1, reliable storage can be achieved without allowing mutual contact of works W being carried.

At four locations on the outer side faces of the pair of left and right skid members 2, that is, at front and rear positions on the left and right of the skid members 2, axles 4 for supporting traveling wheels 3 for rotation around their respective horizontal axes are secured. Thus, the skid members 2 are utilized as part of a framework of the body to make the height of the truck body low although the hybrid carrying truck 1 has a truck carrying function and a skid carrying function, thereby to achieve a design wherein the center of gravity is provided at a low position.

Figure 6:
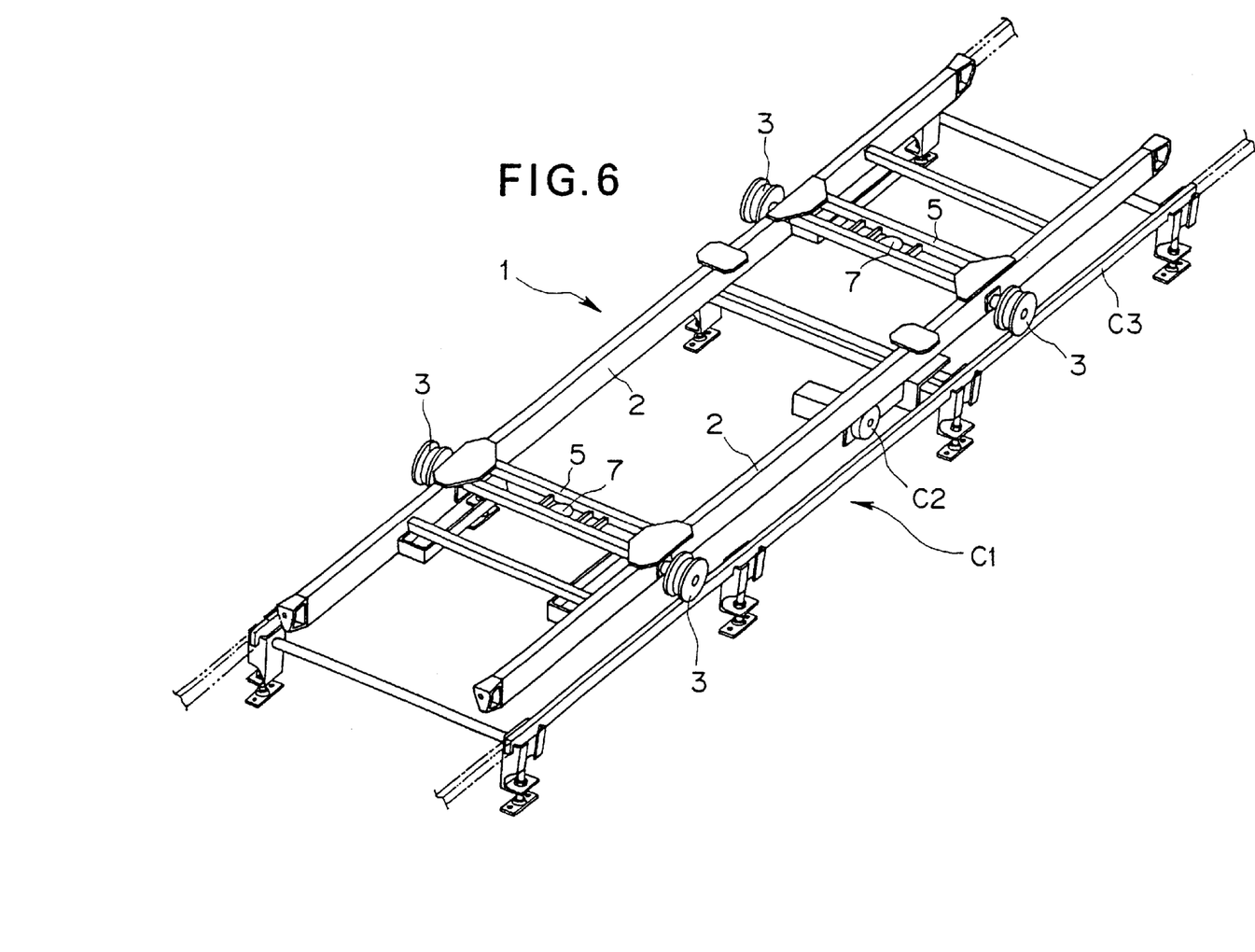
FIG. 6 is a perspective view showing the hybrid carrying truck and the skid carrying roller conveyor in a hybrid carrying condition.

Further, the pair of left and right skid members 2 are connected to each other by a plurality of connection members 5 at different positions in a forward and backward direction of the truck body as shown in FIG. 6.

A work receiving frame 6 is provided for each of a leading end side one and a trailing end side one of the connection members 5 by which the front-rear balance in the carrying direction can be stabilized when a work W is loaded. Thus, a work W in the form of an automobile body is placed on the work receiving frames 6.

It is to be noted that the form of the work receiving frame 6 is not limited to such a specific one as shown in FIGS. 1 and 2, but it may have any form only if it is suitable for the work such as a pallet, a container, a box-like article of a fixed shape or the like.

A truck hauling engaging member 7 is secured to the lower face of each of the connection members 5 by welding or the like. The truck hauling engaging member 7 is in the form of a toe pin or the like extending toward the floor of the carrying line and removably engages with a truck hauling pusher dog of a carrying conveyor laid on the center line of the carrying line to carry the truck body. The truck hauling engaging member 7 is mounted at a central position of the connection member 5 in its axial direction so that the left-right balance may be maintained.

It is to be noted that the form of the truck hauling engaging member 7 is not limited to such a toe pin extending toward the floor of the carrying line as shown in FIGS. 1 and 2, but the truck hauling engaging member 7 may have any form if it is removably engaged with the truck hauling engaging element of the carrying conveyor laid on the center line of the carrying line to carry the truck body.

The hybrid carrying truck 1 having the construction described above can exhibit a form of use suitable for a carrying driving form of the carrying line as described below to receive and carry a work W.

Figure 3:
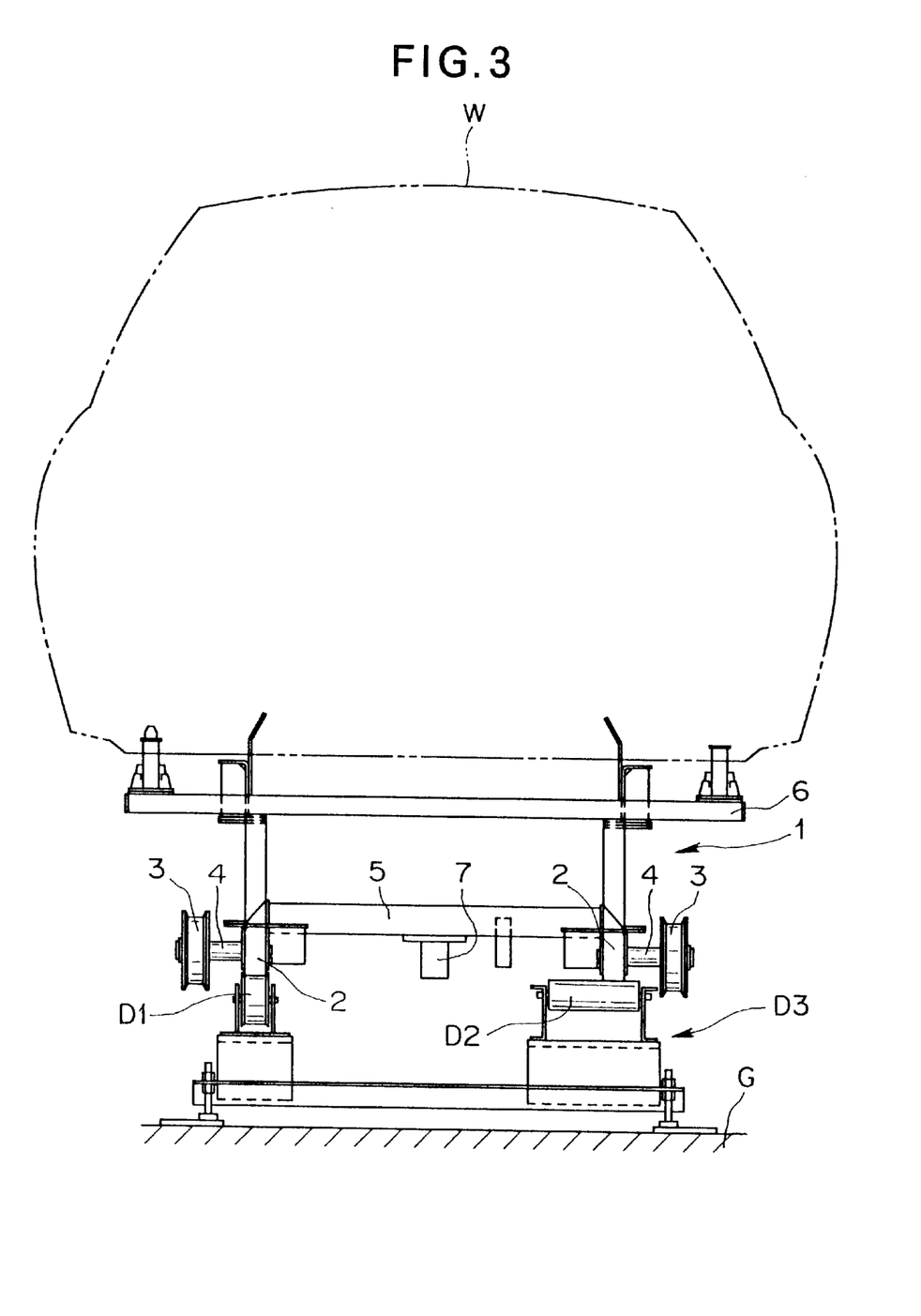
FIG. 3 is a vertical sectional view showing the hybrid carrying truck and a skid carrying conveyor in a skid carrying condition.

In particular, in such a carrying line as shown in FIG. 3 which includes a skid carrying roller conveyor D3 wherein a large number of flanged free rollers D1 which rotate around respective horizontal axes are disposed on one side of the carrying path along a carrying direction and a drive roller D2 which rotates around a horizontal axis is disposed on the other side of the carrying path in an opposing relationship to each of the flanged free rollers D1, the hybrid carrying truck 1 is guided for traveling by the flanged free rollers D1 with which one of the pair of skid members 2 provided on the bottom face of the truck body engages without causing the traveling wheels 3 at the front and rear positions on the left and right sides to function while the hybrid carrying truck 1 is friction driven by the drive rollers D2 with which the other skid member 2 engages. Consequently, the hybrid carrying truck 1 performs skid traveling.

Accordingly, the hybrid carrying truck 1 to which the present invention is applied can be utilized favorably for such a carrying line wherein units formed for the individual drive rollers are assembled.

Figure 4:
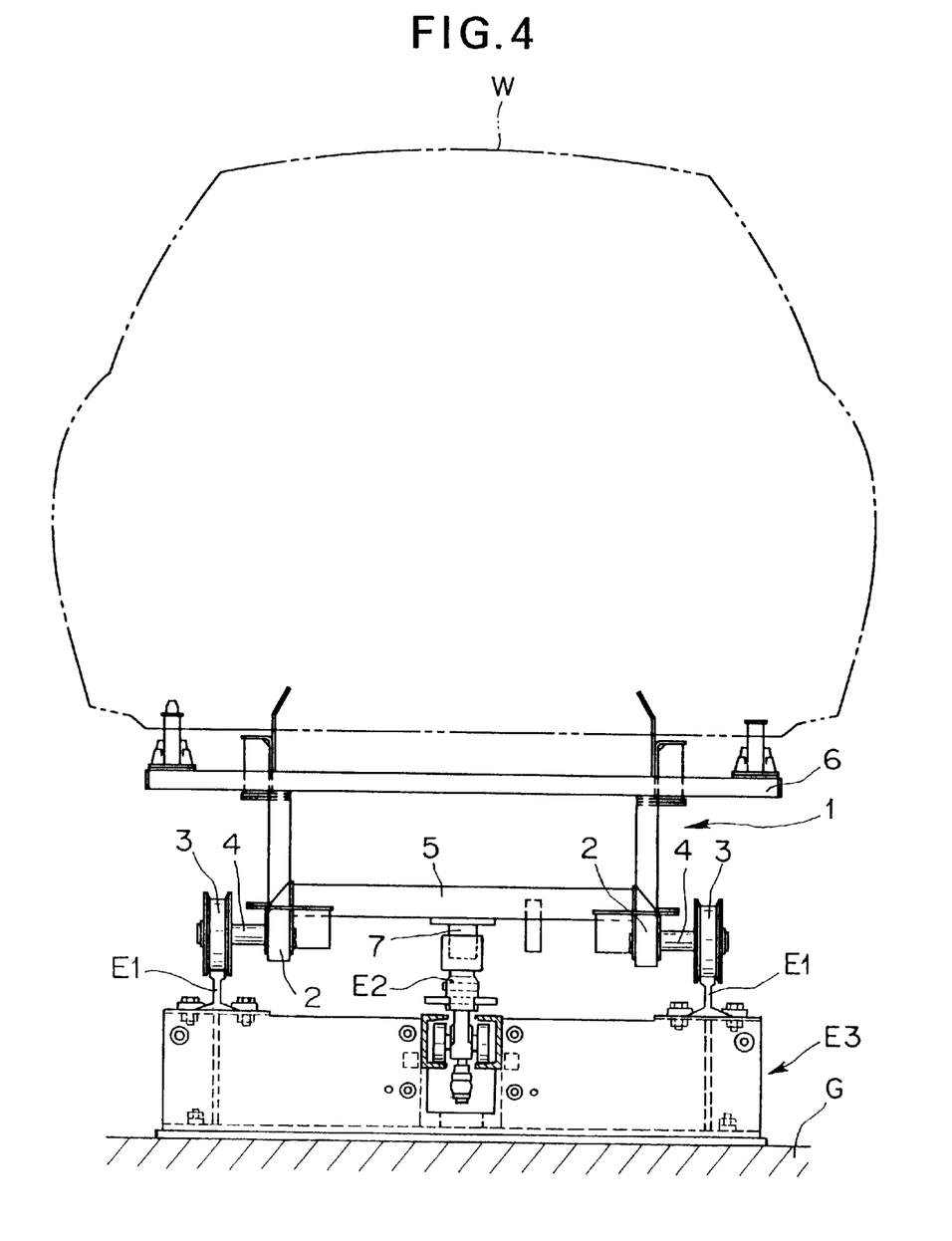
FIG. 4 is a similar view but showing the hybrid carrying truck and a truck carrying conveyor in a wheel carrying condition.

In such a carrying line as shown in FIG. 4 which includes a pair of rails E1 laid along a carrying direction and a truck hauling conveyor E3 having a row of truck hauling pusher dogs E2 at a central position in a widthwise direction of the track, the traveling wheels 3 at the front and rear positions on the left and right provided on the bottom face of the truck body are guided to move along the rails E1 without causing the pair of left and right skid members 2 to function while the hybrid carrying truck 1 is hauled by the truck hauling conveyor E3 which includes the truck hauling pusher dogs E2 with which the truck hauling engaging members 7 engage. Consequently, the hybrid carrying truck 1 performs wheel traveling.

Accordingly, where the hybrid carrying truck 1 to which the present invention is applied is used for such a carrying line as shown in FIG. 4, it can be carried by wheel traveling irrespective of an influence of heat had on the truck body when drying of the work W such as a body of an automobile for which painting has been performed in a painting step is performed. Consequently, the hybrid carrying truck 1 can be utilized advantageously in an oven.

Figure 5:
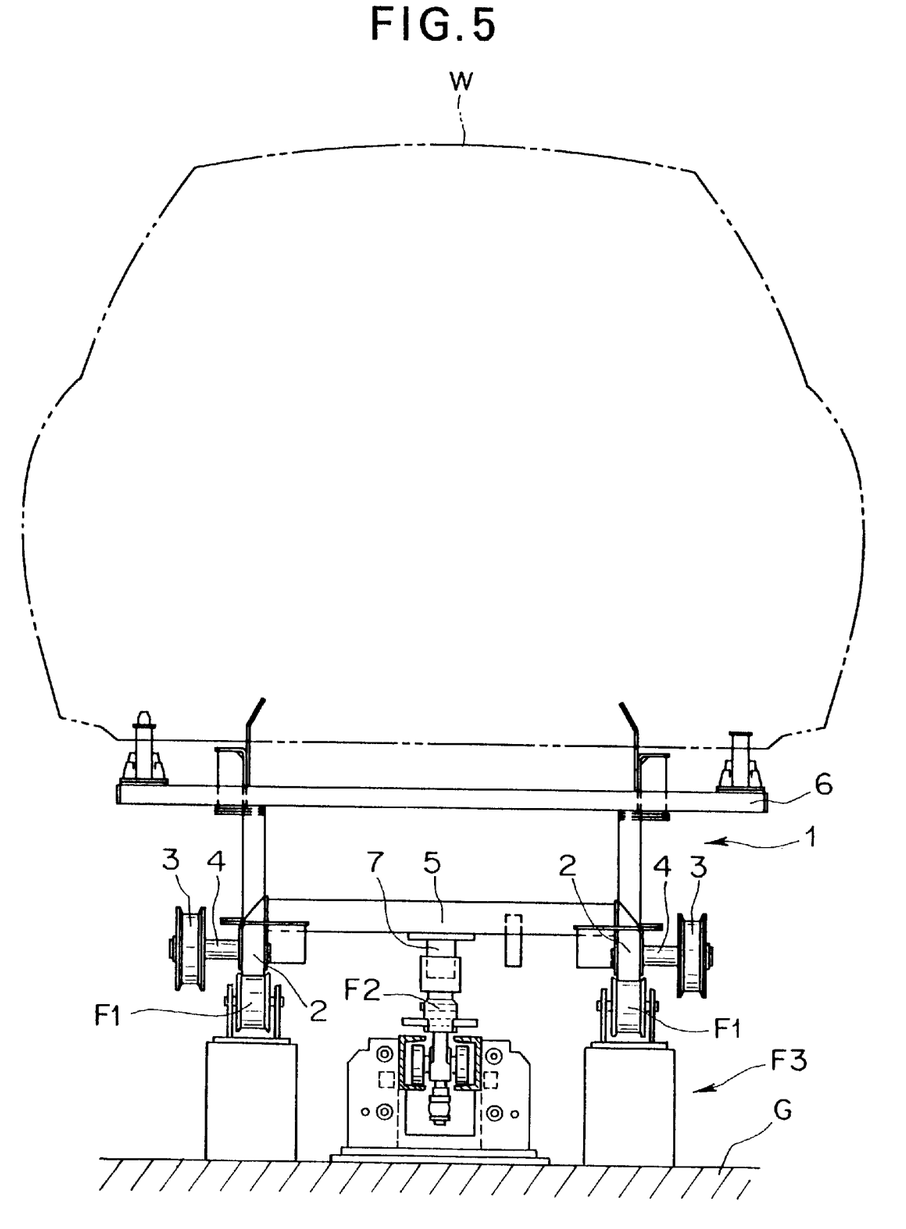
FIG. 5 is a similar view but showing the hybrid carrying truck and the truck carrying conveyor in a skid carrying condition.

In such a carrying line as shown in FIG. 5 which includes a truck hauling conveyor F3 which in turn includes a large number of flanged free rollers F1 disposed for rotation around their respective horizontal axes on the opposite sides of the carrying path along the carrying direction and a large number of truck hauling pusher dogs F2 located in a row at central positions between the rows of the flanged free rollers F1, the hybrid carrying truck 1 is guided for traveling movement by the flanged free rollers F1 with which the pair of skid members 2 provided on the bottom face of the truck body engage without causing the traveling wheels 3 at the front and rear positions on the left and right to function and is hauled by the truck hauling conveyor F3 having the truck hauling pusher dogs F2 with which the truck hauling engaging members 7 engage. Consequently, the hybrid carrying truck 1 effects skid traveling.

Accordingly, where the hybrid carrying truck 1 to which the present invention is applied is used for such a carrying line as shown in FIG. 5, since a wide space can be assured below the truck body, various working operations for the side portions and the bottom portion of the work W can be performed readily.

In such a carrying line as shown in FIG. 6 (which is a perspective view of a carrying conveyor indicated by imaginary lines in FIGS. 1 and 2) which includes a skid carrying roller conveyor C1 which in turn includes a pair of rails C3 along a carrying direction and a large number of drive rollers C2 disposed for rotation around respective horizontal axes along the carrying direction at positions on the inner side of the rails C3, the hybrid carrying truck 1 is guided for traveling by the pair of rails C3 while the traveling wheels 3 at the front and rear positions on the left and right provided on the bottom face of the truck body (the truck hauling engaging members 7 are not shown in FIG. 6) support the overall weight of the truck body, and the hybrid carrying truck 1 is friction driven by the drive rollers C2 with which at least one of the pair of skid members 2 provided on the bottom face of the truck body engages. Consequently, the hybrid carrying truck 1 travels in a condition wherein the force for supporting the weight of the truck and the truck propelling force are individually allotted functionally.

Accordingly, where the hybrid carrying truck 1 to which the present invention is applied is used for such a carrying line as shown in FIG. 6, the power consumption of the drive rollers C2 can be reduced, and smooth intermittent carrying upon storage can be achieved.

Figure 7:
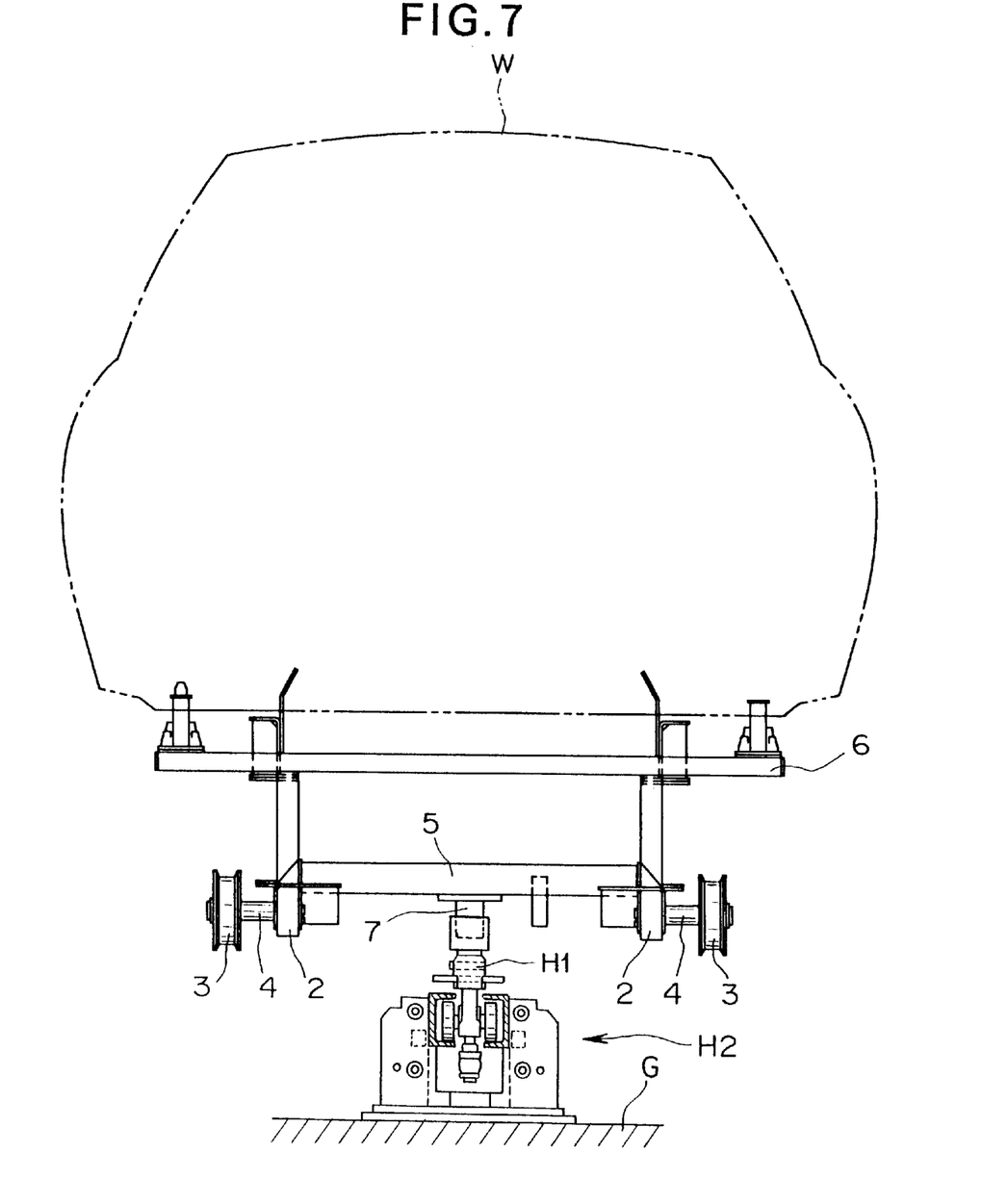
FIG. 7 is a vertical sectional view showing the hybrid carrying truck and the truck carrying conveyor in a traction carrying condition.

In such a carrying line of a curved configuration as shown in FIG. 7 which includes only a truck hauling conveyor H2 having a large number of truck hauling pusher dogs H1 without provision of a pair of rails extending along a carrying direction or a roller conveyor for skid carrying, the hybrid carrying truck 1 is hauled only by the truck hauling conveyor H2 having the truck hauling pusher dogs H1 with which only the truck hauling engaging members 7 provided on the bottom face of the truck body engage without causing the traveling wheels 3 at the front and rear positions on the left and right and the pair of left and right skid members 2 to function, and the overall weight of the truck body is supported by the truck hauling engaging members 7. Consequently, the hybrid carrying truck 1 is hauled to travel only through the engagement with and the support by the truck hauling conveyor H2.

Accordingly, where the hybrid carrying truck 1 to which the present invention is applied is used for such a carrying conveyor for a curved carrying path as shown in FIG. 7, even if the curvature of the carrying line is small, the hybrid carrying truck 1 can smoothly travel along the curved path of a small curvature and reduction of the space for the carrying line can be achieved, and consequently, the degree of freedom in layout designing of the carrying line can be augmented.

In transfer between carrying lines having different carrying driving forms such as between a carrying conveyor wherein the traveling wheels 3 at the front and rear positions on the left and right do not function such as the carrying conveyor shown in FIG. 3 or 5 and another carrying conveyor wherein the pair of left and right skid members 2 do not function such as the carrying conveyor shown in FIG. 4, either while the traveling wheels 3 at the front and rear positions on the left and right are guided for traveling along one of the carrying lines to support the truck body, the leading ends of the pair of left and right skid members 2 are guided to the other carrying line having a different carrying path form and then the overall weight of the truck body is successively moved to transfer the hybrid carrying truck 1, or while the pair of left and right skid members 2 are guided for traveling along both of the carrying lines having different carrying driving forms and the overall weight of the truck body is supported by both of the carrying lines, the traveling wheels 3 at the front and rear positions on the left and right are guided to one of the carrying lines which is to subsequently receive the hybrid carrying truck 1 and the overall weight of the truck body is gradually moved to transfer the hybrid carrying truck 1.

Accordingly, with the hybrid carrying truck 1 to which the present invention is applied, the overall weight of the truck body can be transferred smoothly to a destination of the transfer, and rattling movement which is likely to occur upon transfer does not occur and stabilized transfer can be achieved.

Further, with the hybrid carrying truck 1 to which the present invention is applied, since the axles 4 of the traveling wheels 3 are secured to the outer side faces of the skid members 2, the skid members 2 are disposed on the inner sides of the left and right traveling wheels 3 and the working space for the bottom of the truck body can be assured widely toward the center in the widthwise direction of the truck. Consequently, the workability in various works for the bottom face of the truck body can be augmented significantly. Besides, since the skid members 2 are used as part of the body framework, although the hybrid carrying truck 1 has both of a truck carrying function and a skid carrying function, the height of the truck body can be made low thereby to lower the position of the center of gravity, and consequently, the truck body can be simplified and reduced in weight.

While a preferred embodiment of the present invention has been described using specific terms, such description is for illustrative purposes only, and it is to be understood that changes and variations may be made without departing from the spirit or scope of the following claims.

What is claimed is:

1. A hybrid carrying truck, comprising:

truck body;

two pairs of traveling wheels mounted at front and back positions on the left and right sides of said truck body for being rolled on a pair of rails of a first type of carrying line to support said truck body on said rails and allow said truck body to travel along said first type of carrying line;

a pair of left and right skid members mounted on a bottom face of said truck body and elongated in a carrying direction of said hybrid carrying truck for engaging with a pair of rows of rollers of a second type of carrying line to support said truck body on said rollers and allow said truck body to travel along said second type of carrying line; and a truck hauling engaging member mounted at a central position of the bottom face of said truck body in a widthwise direction of said truck body for engaging with a truck hauling pusher dog disposed on the center line of said first or second type of carrying line or a third type of carrying line to allow said truck body to be hauled by said truck hauling pusher dog to travel along the carrying line, wherein said skid members form part of said truck body, and said traveling wheels are supported for rotation around respective horizontal axes on respective axles secured to, and extending laterally from, said skid members.

2. A hybrid carrying truck as claimed in claim 1, wherein said axles are mounted on inner side faces of said skid members in a widthwise direction of said truck body.

3. A hybrid carrying truck as claimed in claim 1, wherein said axles are mounted on outer side faces of said skid members in a widthwise direction of said truck body.

4. A conveyor system having a first type of carrying line comprising a pair of rails, a second type of carrying line comprising a pair of rows of rollers, and a hybrid carrying truck, at least one of said carrying lines having a center line and including a truck hauling pusher dog disposed on said center line, the hybrid truck comprising:

a truck body;

two pairs of traveling wheels mounted at front and back positions on the left and right sides of said truck body for being rolled on said pair of rails of the first type of carrying line to support said truck body on said rails and allow said truck body to travel along said first type of carrying line;

a pair of left and right skid members mounted on a bottom face of said truck body and elongated in a carrying direction of said hybrid carrying truck for engaging with said pair of rows of rollers of the second type of carrying line to support said truck body on said rollers and allow said truck body to travel along said second type of carrying line; and a truck hauling engaging member mounted at a central position of the bottom face of said truck body in a widthwise direction of said truck body for engaging with said truck hauling pusher dog to allow said truck body to be hauled by said truck hauling pusher dog to travel along said at least one of said carrying lines, wherein said skid members form part of said truck body, and said traveling wheels are supported for rotation around respective horizontal axes on respective axles secured to, and extending laterally from, said skid members.

5. A conveyor system as claimed in claim 4, wherein said axles are mounted on inner side faces of said skid members in a widthwise direction of said truck body.

6. A hybrid carrying truck as claimed in claim 4, wherein said axles are mounted on outer side faces of said skid members in a widthwise direction of said truck body.

* * * * *